(12) United States Patent
Kim et al.

(10) Patent No.: US 9,108,851 B2
(45) Date of Patent: Aug. 18, 2015

(54) HIGHLY CONDUCTIVE CARBON NANOTUBE HAVING BUNDLE MOIETIES WITH ULTRA-LOW BULK DENSITY AND ITS MANUFACTURING METHOD

(71) Applicants: Dong Hwan Kim, Daejeon (KR); Wan Sung Lee, Daejeon (KR); Woo Ram Jung, Daejeon (KR); Youngchan Jang, Daejeon (KR)

(72) Inventors: Dong Hwan Kim, Daejeon (KR); Wan Sung Lee, Daejeon (KR); Woo Ram Jung, Daejeon (KR); Youngchan Jang, Daejeon (KR)

(73) Assignee: KOREA KUMHO PETROCHEMICAL CO., LTD., Seoul (KR)

( * ) Notice: Subject to any disclaimer, the term of this patent is extended or adjusted under 35 U.S.C. 154(b) by 226 days.

(21) Appl. No.: 13/765,373

(22) Filed: Feb. 12, 2013

(65) Prior Publication Data

US 2013/0207026 A1    Aug. 15, 2013

(30) Foreign Application Priority Data

Feb. 13, 2012    (KR) .................. 10-2012-0014108

(51) Int. Cl.
*C01B 31/02*    (2006.01)
*B82Y 30/00*    (2011.01)
*B82Y 40/00*    (2011.01)

(52) U.S. Cl.
CPC ............. *C01B 31/0233* (2013.01); *B82Y 30/00* (2013.01); *B82Y 40/00* (2013.01)

(58) Field of Classification Search
None
See application file for complete search history.

(56) References Cited

U.S. PATENT DOCUMENTS

2010/0152326 A1*  6/2010  Kurz ............................. 523/339
2011/0315931 A1*  12/2011  Aradi et al. .................. 252/373

OTHER PUBLICATIONS

Teo et al. "Catalytic Synthesis of Carbon Nanotubes and Nanofibers." Copyright © 2003 by American Scientific Publishers, pp. 1-22, attached to the case file as a PDF.*

* cited by examiner

*Primary Examiner* — Harold Pyon
*Assistant Examiner* — Katie L Hammer
(74) *Attorney, Agent, or Firm* — Kenyon & Kenyon LLP

(57) ABSTRACT

The present invention relates to a highly conductive carbon nanotube having bundle moieties with ultra low apparent density less than 0.01 g/cc. More specifically, this invention relates to a highly conductive carbon nanotube prepared by following preparation steps of i) preparing the sphere shape of metal catalyst by spray pyrolysis of catalytic metal precursor solution including low molecular weight polymer, ii) synthesizing carbon nanotube using carbon source and obtained metal catalyst according to thermal chemical vapor deposition method; and iii) obtaining a highly conductive carbon nanotube having bundle moieties with ultra-low bulk apparent density.

5 Claims, 3 Drawing Sheets

HIGHLY CONDUCTIVE CARBON NANOTUBE HAVING BUNDLE MOIETIES WITH ULTRA-LOW BULK DENSITY AND ITS MANUFACTURING METHOD

BACKGROUND OF THE INVENTION

1. Field of the Invention

The present invention relates to a highly conductive carbon nanotube having bundle moieties with ultra low apparent density less than 0.01 g/cc. More specifically, this invention relates to a highly conductive carbon nanotube prepared by following preparation steps of i) preparing the sphere shape of metal catalyst by spray pyrolysis of catalytic metal precursor solution including low molecular weight polymer, ii) synthesizing carbon nanotube using carbon source and obtained metal catalyst according to thermal chemical vapor deposition method; and iii) obtaining a highly conductive carbon nanotube having bundle moieties with ultra-low bulk apparent density.

Further, a carbon nanotube having bundle moieties prepared by thermal chemical vapor deposition method using specific metal catalyst composition by spray pyrolysis of catalytic metal precursor solution shows 0.003~0.010 g/cc of bulk apparent density, 3~15 nm of diameter of carbon nanotube, 5~100 μm of vertically aligned bundle diameter, and 10~500 μm of bundle length. Further, a carbon nanotube having bundle moieties prepared by present method can be used for manufacturing highly conductive carbon nanotube-polymer complex when carbon nanotube of present application is mixed with polymer.

2. Description of Prior Art

Carbon nanotube was firstly disclosed by Dr. Iijima in Nippon Electric Company (NEC) by arc discharging the carbon rod containing metal catalyst (S. Iijima, Nature, 354, 56 (1991)). The further studies of carbon nanotube disclosed that carbon nanotube shows diverse and advantageous physical and chemical properties. The technical developments in controlling the structure of carbon nanotube let it be applied to various fields of industries, such as, reinforcing agent of polymer, pharmaceuticals, storage of energy, catalyst support for polymer synthesis.

A research group of Baker and N. M. Rodriguez in the United States has specifically developed the crystalline structure of carbon nano materials (J. Mater. Res., Vol 8: 3233~3250, 1993). As preparation methods of carbon nanotube, an arc discharge method, a laser ablation method, a catalytic growing method and a plasma method have been described in following documents: that are, R. E. Smalley et al., J. Phs. Chem., 243, 49(1995); M. Endo et al., Carbon, 33, 873(1995); U.S. Pat. No. 5,424,054; Chem. Phys. Lett., 243, 1-12(1995); Science, 273: 483-487(1996); and U.S. Pat. No. 6,210,800.

For a commercial use of carbon nanotube, it is very important to produce high quality of carbon nanotube in a low cost. It has been known that structural control of diameter or length of carbon nano material can be accomplished by understanding of transition metal, catalyst support materials and interaction between transition metal and catalyst support materials.

In PCT International publication No. WO 2006/50903 'Catalyst for producing carbon nanotubes by means of the decomposition of gaseous carbon compounds on a heterogeneous catalyst', it has been disclosed that the transition metal catalyst composition comprising Mn, Co, optionally Mo and a support material enables to produce carbon nanotube having 3~150 nm of diameter in a high catalytic yield. However, there is no specific description about the role of catalyst particle shape for enhancing the electro conductivity of carbon nanotube in the dispersed carbon nanotube solution.

In Korean Early Patent Publication No. 10-2006-18472 'Process for preparing carbon nanotube using the mechano-chemical treated catalyst', carbon nano fiber prepared by a chemical vapor deposition method using acetylene as a carbon source in the presence of mechano-chemical treated support catalyst comprising Ni and Mg support has been disclosed.

In Korean Early Patent Publication No. 10-2005-78596 'Purification method of carbon nanotube and preparation method of carbon nanotube', carbon nanotube prepared by a plasma chemical vapor deposition method has been disclosed. Further, in this preparation method, the plasma chemical vapor deposition method comprises i) substrate preparation step for growing carbon nanotube; ii) growing step for carbon nanotube on the said substrate; and iii) purification step of carbon nanotube using plasma of inert gas has been disclosed. However, carbon nanotube obtained using this method cannot afford high electro conductivity in the dispersed carbon nanotube solution or polymer matrix.

The preparation method for the synthesis of carbon nanotube disclosed in various technical documents or patents can be specified by the kind and ratio of transition metals and the shape and size of support materials included in catalyst composition. Regarding the preparation of catalyst composition, it has been described in following documents. P. E. Anderson et al., J. Mater. Res., 14(7), 2912(1999); and R. J. Best, W. W. Russell, J. Am. Chem. Soc., 76, 838(1974). Nonetheless, it is still required to develop a catalyst composition to enhance the catalytic productivity as well as to realize structural characteristics of carbon nanotube by controlling the numerous variables regarding catalyst synthesis.

However, the shape of carbon nanotube for effective dispersion in the solution has never been developed or disclosed in the prior art. Further, the characteristics of suitable catalyst for highly conductive carbon nanotube have not been disclosed regardless of batch or continuous synthesis process.

Most of catalyst for the synthesis of carbon nanotube has a shape of sphere or fine particle. In the field of nano technology, sol-gel, co-precipitation, hydrous pyrolysis, and/or flame metal combustion method has been adopted for preparing catalyst precursor, followed by drying the obtained catalyst precursor using freeze drying or spray drying for minimizing the aggregation of catalyst particles. On the other hand, the vertically aligned growth of carbon nanotube applied from semiconductor manufacturing process has been tried. However, this synthetic method cannot be regarded as suitable method for coating solution or polymer compound of carbon nanotube.

Entangled type of carbon nanotube aggregate has been required to be changed into fibrous type of carbon nanotube for being dispersed in solution or polymer matrix. For this purpose, chemical treatment of surface for enhancing dispersibility or mechanical treatment of carbon nanotube with high energy has been required. However, it is not easy to maintain the native characteristics of carbon nanotube during such chemical or mechanical treatment or carbon nanotube.

Vertically aligning technology has been suggested by Hata Research Group in Japan on the basis of super-growth of carbon nanotube in the limited bundle surface. Such vertically aligned bundle type of carbon nanotube may be advantageous in the dispersion of carbon nanotube rather than entangled type of carbon nanotube particles. Further, if such aligned bundle type of carbon nanotube can be manufactured according to thermal chemical deposition method, this aligned bundle type of carbon nanotube can be much advantageous in solution dispersion or polymer compounding of carbon nanotube, because less energy may be required for dispersion.

Such high dispersion mechanism may proceed step by step from macro size level to micro size level, eventually to accomplish nano size level dispersion as shown in FIG. 5.

However, carbon nanotube prepared according to conventional method may cause the structural decomposition of carbon nanotube in the course of cutting-off or crushing the carbon nanotube to be dispersed in the solution or polymer matrix as well as loss of conductivity of carbon nanotube.

Therefore, the inventors of present invention have developed a highly conductive carbon nanotube having bundle moieties with ultra-low bulk density by controlling the metal catalyst composition and synthetic steps of preparation process for carbon nanotube. Eventually, the obtained carbon nanotube having bundle moieties of present invention has following properties; i) apparent density of carbon nanotube is 0.003~0.010 g/cc, ii) fibrous diameter is 3~15 nm; iii) diameter of vertically aligned bundle is 5~100 μm; and iv) the length of bundle is 10~500 μm.

Further, the inventors of present invention have also developed a mass production method for carbon nanotube having bundle moieties, using specifically prepared metal catalyst composition. The metal catalyst composition comprises Al and Mn as well as main catalyst metal, wherein the amount of Mn as to the amount of Al is in the range of 0.1~20 wt %. Further, the metal catalyst composition contains a small portion of low molecular weight polymer to avoid the aggregation of metal catalyst composition powder during the spray pyrolysis process. On the other hand, the carbon nanotube having bundle moieties of present invention can be obtained by controlling the synthetic steps of preparation process for carbon nanotube with following physical properties; i) apparent density of carbon nanotube is 0.003~0.010 g/cc, ii) fibrous diameter is 3~15 nm; iii) diameter of vertically aligned bundle is 5~100 μm; and iv) the length of bundle is 10~500 μm.

SUMMARY OF THE INVENTION

The object of present invention is to provide a process for preparing a highly conductive carbon nanotube having bundle moieties with ultra-low bulk density comprising the steps of:

i) obtaining a metal catalyst composition prepared by following preparation steps comprising; a) dissolving 100 weight part of metal catalyst particles represented by following formula and 0.1~20 weight part of low molecular weight polymer as anti-aggregation agent in the water, and b) preparing a metal catalyst composition according to spray pyrolysis method; and

[Fe,Co,Ni]p[Al$_a$Mg$_b$Mn$_c$]q wherein p and q represent molar fraction of [Fe,Co,Ni] and [Al$_a$Mg$_b$Mn$_c$], $p+q=1, 0.3 \leq p \leq 0.8, 0.2 \leq q \leq 0.7$, a, b and c represent molar fraction of Al, Mg, Mn, respectively;

$a+b+c=1, 0.1 \leq a \leq 0.8, 0.1 \leq b \leq 0.9, 0.01 \leq c \leq 0.2$, ii) synthesizing a carbon nanotube having bundle moieties using carbon source at 600~800° C. in the presence of metal catalyst composition obtained in step i) according to chemical vapor deposition method, wherein the apparent density of metal catalyst particle is 0.03~0.90 g/cc and the apparent density of carbon nanotube having bundle moieties is 0.003~0.010 g/cc.

Further, said low molecular weight polymer as anti-aggregation agent has its own weight average molecular weight (M$_w$) in the range of 100~10,000 g/mol.

Further, said low molecular weight polymer is selected from ionic or non-ionic dispersing agent.

Further, said ionic dispersing agent is at least one selected from sodium dodecyl benzene sulfate(NaDDBS), sodium dodecyl sulfate(SDS), cetyl trimethyl ammonium chloride (CTAC) or dodecyl trimethyl ammonium bromide(DTAB).

Further, said non-ionic dispersing agent comprises head part and tailing part, wherein the head part is at least one aromatic hydrocarbon selected from benzene, naphthalene, acenaphtalene, acenaphtene, anthracene, phenanthrene, pyrene or benzanthracene, and the tail part is polymer chain consisting hydrophilic repeated unit, such as, ethylene oxide or propylene oxide.

Another object of present invention is to provide a highly conductive carbon nanotube having bundle moieties with ultra-low bulk density prepared by present invention.

The further object of present invention is to provide a use for highly conductive carbon nanotube having bundle moieties with ultra-low bulk density prepared by present invention, wherein it is applied to antistatic, electromagnetic wave shield and/or high thermal conductive material.

A) shape of carbon nanotube having bundle moieties before dispersion

B) shape of carbon nanotube having bundle moieties in macro size level

C) shape of carbon nanotube having bundle moieties in micro size level

D) shape of carbon nanotube in nano size level

Figure 6:
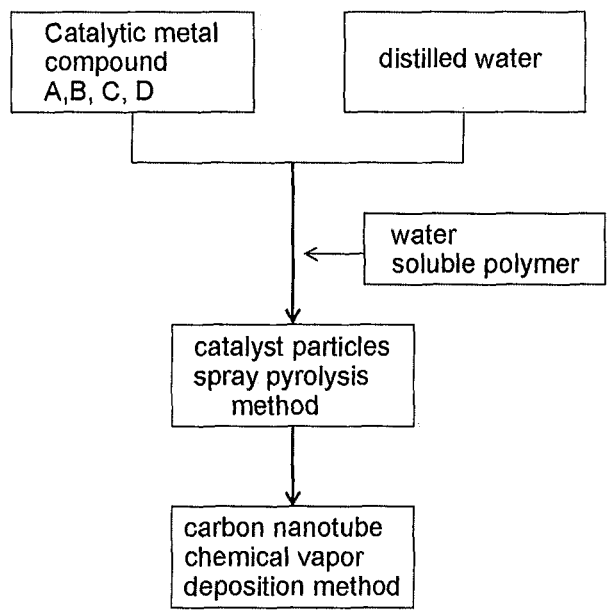

FIG. 6 shows a flow chart for preparing catalyst composition used for preparing carbon nanotube having bundle moieties in Examples of present invention

DETAILED DESCRIPTION OF THE INVENTION

The present invention relates to a highly conductive carbon nanotube having bundle moieties with ultra low apparent density, which shows high dispersion property in solution or polymer matrix without additional chemical or physical treatment. Further, the present invention also affords the mass production method of said highly conductive carbon nanotube having bundle moieties.

The present invention also provides a process for preparing a highly conductive carbon nanotube having bundle moieties with ultra-low bulk density comprising the steps of:

i) obtaining a metal catalyst composition prepared by following preparation steps comprising; a) dissolving 100 weight part of metal catalyst particles represented by following formula and 0.1~20 weight part of low molecular weight polymer as anti-aggregation agent in the water, and b) preparing a metal catalyst composition according to spray pyrolysis method; and

[Fe, Co,Ni]p [Al$_a$Mg$_b$Mn$_c$]q wherein p and q represent molar fraction of [Fe,Co,Ni] and [Al$_a$Mg$_b$Mn$_c$], $p+q=1, 0.3 \leq p \leq 0.8, 0.2 \leq q \leq 0.7$, a, b and c represent molar fraction of Al, Mg, Mn, respectively;

$a+b+c=1, 0.1 \leq a \leq 0.8, 0.1 \leq b \leq 0.9, 0.01 \leq c \leq 0.2$, ii) synthesizing a carbon nanotube having bundle moieties using carbon source at 600~800° C. in the presence of metal catalyst composition obtained in step i) according to chemical vapor deposition method, wherein the apparent density of metal catalyst particle is 0.03~0.90 g/cc and the apparent density of carbon nanotube having bundle moieties is 0,003~0.010 g/cc.

Further, the apparent density of carbon nanotube having bundle moieties is 0.003~0.010 g/cc, preferably 0.004~0.009 g/cc.

Further, for obtaining a metal catalyst composition, low molecular weight polymer as anti-aggregation agent can be added and dispersed in the metal catalyst aqueous solution to avoid aggregation of catalyst particles generated during the spray pyrolysis method.

Further, said low molecular weight polymer as anti-aggregation agent has its own weight average molecular weight (M$_W$) in the range of 100~10,000 g/mol. The amount of low molecular weight polymer is in the range of 0.1~20 wt % as to total amount of catalyst composition, preferably 0.5~10 wt %.

Further, the catalyst composition may comprise transition metal and non-transition metal support. The amount of transition metal is in the range of 10~80 wt %, preferably 30~70 wt %. The component of transition metal can be at least one metal selected from Fe, Ni, Co. As non-transition metal support, at least one selected from Al, Mg, Ca, Si, Zn, Ti, Mn, titania, silica, mica and/or alumina silicate can be used. The amount of non-transition metal support is in the range of 10~80 wt %, preferably 30~70 wt %. If Al and Mn are used for non-transition metal support, the amount of Mn as to the amount of Al is in the range of 0.1~80 wt %, preferably 0.1~20 wt %.

In case that metal catalyst composition for preparing carbon nanotube is prepared according to spray pyrolysis method, the temperature of heat treatment is in the range of 400~1,000° C., preferably, 500~800° C. The supplied spraying amount can be in the range of 0.1~40 L/hour, preferably 0.5~20 L/hour.

The apparent density of metal catalyst particles is in the range of 0.03~0.90 g/cc, preferably 0.05~0.40 g/cc.

The shape of catalyst particle prepared by spray pyrolysis method shows generally sphere type shape. However, other shape of catalyst particle, such as, plate shape, plate-shape frame, needle-shape frame can be available according to the kinds of catalyst metal. Further, the average particle size is in the range of 5~200 μm, preferably 10~100 μm.

The synthesis of carbon nanotube having bundle moieties of present invention can be prepared using carbon source at least one selected from methane, ethylene, acetylene, alcohol, xylene, benzene, hexane, toluene. The preferred carbon source is carbohydrate compound having less than 3 carbon number. The reaction temperature for the synthesis of carbon nanotube is in the range of 400~1,000° C., preferably 500~800° C. The thermal chemical vapor deposition method is preferred for the synthesis of carbon nanotube.

The supply of carbon source can be controlled in the range of 0.1~120 L/minute, preferably 0.1~90 L/minute by precise gas supplier. As the reactor for thermal chemical vapor deposition method, cylinder type of reactor made by quartz or heat resistant metal can be generally used.

As the reactor for thermal chemical vapor deposition method, rotary type reactor, vertical type reactor or fluidized bed type reactor using the flow of catalyst metal particle can be used. The preferred type of reactor can be selected from continuous rotary type reactor, continuous fluidized bed type reactor or batch synthesis reactor.

The conditions of thermal chemical vapor deposition method can be varied according to the type, shape and/or amount of metal catalyst. Further, reaction temperature, reaction time and/or thermal decomposition temperature of hydrocarbon compound also affect the synthesis of carbon nanotube. The preferred reaction temperature for synthesizing carbon nanotube having bundle moieties is in the range of 500~1,000° C., preferably 500~800° C. The preferred reaction time is in the range of 0.5~5 hours, preferably, 0.66~3 hours.

The apparent density of synthesized carbon nanotube having bundle moieties can be determined according to the fibrous diameter of carbon nanotube, length and/or size of obtained carbon nanotube bundle. The ordinary apparent density of conventional carbon nanotube is in the range of 0.02~0.10 g/cc.

However, the apparent density of carbon nanotube having bundle moieties of present invention is in the range of 0.003~0.010 g/cc, which affords excellent dispersion in the solution or polymer matrix as well as highly excellent electroconductivity of carbon nanotube. If the apparent density of carbon nanotube having bundle moieties is higher than this range, the carbon nanotube dispersion in solution or polymer matrix becomes lower.

The obtained carbon nanotube having bundle moieties of present invention shows following physical properties; i) apparent density of carbon nanotube is 0.003~0.010 g/cc, ii) fibrous diameter is 3~15 nm; iii) diameter of vertically aligned bundle is 5~100 μm; and iv) the length of bundle is 10~500 μm.

Highly conductive carbon nanotube having bundle moieties with ultra-low bulk density prepared by present invention can be applied to antistatic, electromagnetic wave shield and/or high thermal conductive material.

For obtaining a metal catalyst composition, low molecular weight polymer as anti-aggregation agent can be added and dispersed in the metal catalyst aqueous solution to avoid aggregation of catalyst particles generated during the spray pyrolysis method. Further, said low molecular weight polymer has its own weight average molecular weight(M$_W$) in the range of 100~10,000 g/mol. The amount of low molecular weight polymer is in the range of 0.1~20 wt % as to total amount of catalyst composition, preferably 0.5~10 wt %.

Said low molecular weight polymer can be ionic or non-ionic dispersing agent.

Said ionic dispersing agent can be at least one selected from sodium dodecyl benzene sulfate(NaDDBS), sodium dodecyl sulfate(SDS), cetyl trimethyl ammonium chloride (CTAC) or dodecyl trimethyl ammonium bromide(DTAB).

Non-ionic dispersing agent can be preferably used as low molecular weight polymer. Said non-ionic dispersing agent comprises head part and tailing part, wherein the head part is at least one aromatic hydrocarbon selected from benzene, naphthalene, acenaphtalene, acenaphtene, anthracene, phenanthrene, pyrene or benzanthracene, and the tail part is polymer chain consisting hydrophilic repeated unit, such as, ethylene oxide or propylene oxide.

Further, in case that carbon nanotube of present invention is melt-mixed in polymer matrix, the amount of carbon nanotube is in the range of 0./1~30 wt %, preferably 0.3~20 wt % in the polymer matrix.

The present invention can be explained more concretely by following Examples and Comparative Examples. However, the scope of the present invention shall not be limited by following Examples.

EXAMPLES

Example 1

Preparation of Carbon Nanotube Having Bundle Moieties and Preparation of Dispersed Solution (1) Preparation of Metal Catalyst for the Synthesis of Carbon Nanotube Having Bundle Moieties 1,074.3 g of iron nitrate ($Fe(NO_3)_2.9H_2O$), 2,064.8 g of aluminum nitrate ($Al(NO_3)_3.9H_2O$), 31.8 g of magnesium nitrate ($Mg(NO_3)_2.6H_2O$) and 3 g of polyoxyethylene stearyl ether (Mw 5,000) have been mixed and dissolved in 2500 ml of distilled water for 2 hours with a magnetic stirrer. Obtained catalyst solution has been transferred in a velocity of 2 L/hour of air, and said catalyst solution has been sprayed into vertical thermal reactor from the spraying nozzle of 750° C. according to gas atomization method. The pyrolysis of sprayed catalyst solution has been made for 30 minutes. Then, the average particle size has been controlled less than 21.6 μm. The apparent density of obtained catalyst particle has been measured according to ASTM D 1895. The physical properties of obtained catalyst particle have been shown in Table 1. Further, FIG. 6 illustrates the flow chart for preparing catalyst composition used for preparing carbon nanotube having bundle moieties of Examples.

Figure 1:
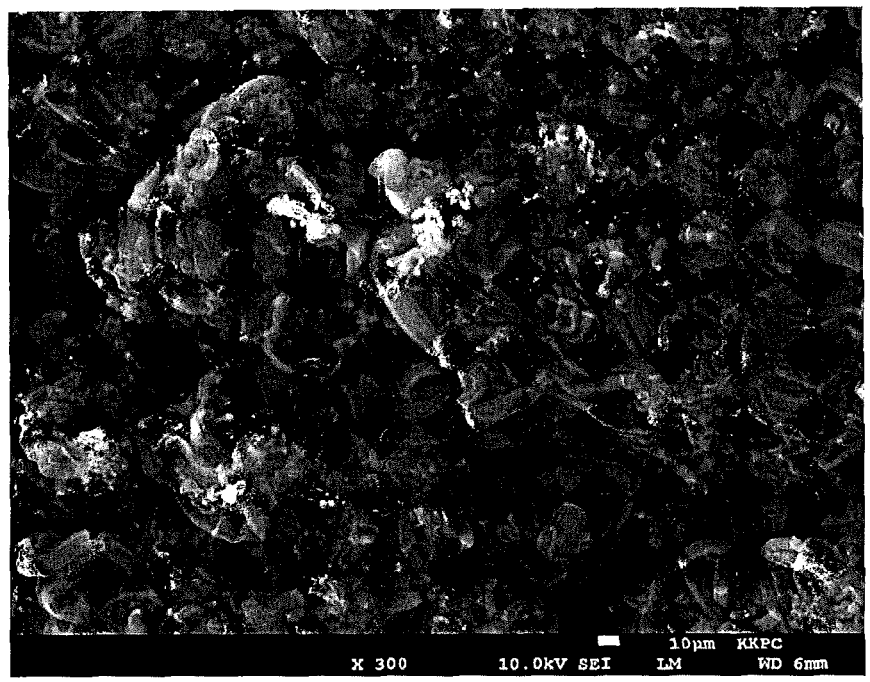
FIG. 1 shows a Field Emission Scanning Electron Microscope (FE-SEM) photograph (magnitude: 300×) of carbon nanotube having bundle moieties prepared in Example 1 of present invention.
Figure 2:
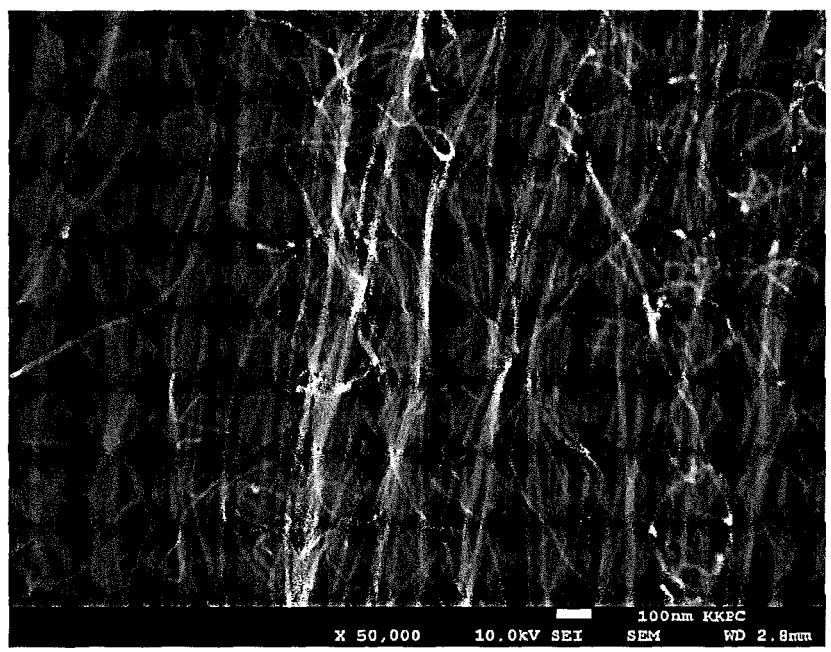
FIG. 2 shows a Field Emission Scanning Electron Microscope (FE-SEM) photograph (magnitude: 50,000×) of carbon nanotube having bundle moieties prepared in Example 1 of present invention.

(2) Preparation of Carbon Nanotube Having Bundle Moieties 1 g of catalyst particle having 0.0670 g/cc of apparent density has been inserted in the quartz horizontal reactor having 100 mm of diameter using plate tray made by quartz. Ethylene as carbon source also flowed into the reactor in a velocity of 0.32 L/minute for 60 minutes. The reaction for preparing carbon nanotube having bundle moieties has been made at 650° C. The physical properties of prepared carbon nanotube having bundle moieties have been shown in Table 2. The bundle shape of obtained carbon nanotube has been shown in FIG. 1 and FIG. 2.

Measurement of the carbon conversion yield is made by following calculation:

{[The amount of obtained carbon nanotube (g)–The amount of inserted catalyst(g)]/The amount of inserted catalyst (g)}×100

(3) Preparation of Dispersed Coating Solution of Using Carbon Nanotube Having Bundle Moieties 0.3 mg of obtained carbon nanotube and 60 ml of ethanol have been mixed and inserted into 100 cc of glass bottle. The dispersion has been made using 420 W ultrasonic homogenizer for 10 minutes. The thin film of carbon nanotube has been made from dispersed carbon nanotube solution using membrane filter. The surface resistance value of thin film has been measured after drying for 2 hours at 100° C. according to 4-point method. The results of surface resistance value of thin film made by carbon nanotube ethanol solution have been shown in Table 3.

Example 2

Preparation of Carbon Nanotube Having Bundle Moieties and Preparation of Dispersed Solution (1) Preparation of Metal Catalyst for the Synthesis of Carbon Nanotube Having Bundle Moieties 1,074.3 g of iron nitrate ($Fe(NO_3)_2.9H_2O$), 1,858.3 g of aluminum nitrate ($Al(NO_3)_3.9H_2O$), 31.8 g of magnesium nitrate ($Mg(NO_3)_2.6H_2O$), 77.6 g of manganese nitrate(Mn $(NO_3)_2.H_2O$) and 3 g of polyoxyethylene stearyl ether (Mw 5,000) have been mixed and dissolved in 2500 ml of distilled water for 2 hours with a magnetic stirrer. Obtained catalyst solution has been transferred in a velocity of 2 L/hour of air, and said catalyst solution has been sprayed into vertical thermal reactor from the spraying nozzle of 750° C. according to gas atomization method. The pyrolysis of sprayed catalyst solution has been made for 30 minutes. Then, the average particle size has been controlled less than 20.7 μm. The apparent density of obtained catalyst particle has been measured according to ASTM D 1895. The physical properties of obtained catalyst particle have been shown in Table 1. Further, FIG. 6 illustrates the flow chart for preparing catalyst composition used for preparing carbon nanotube having bundle moieties of Examples.

Figure 3:
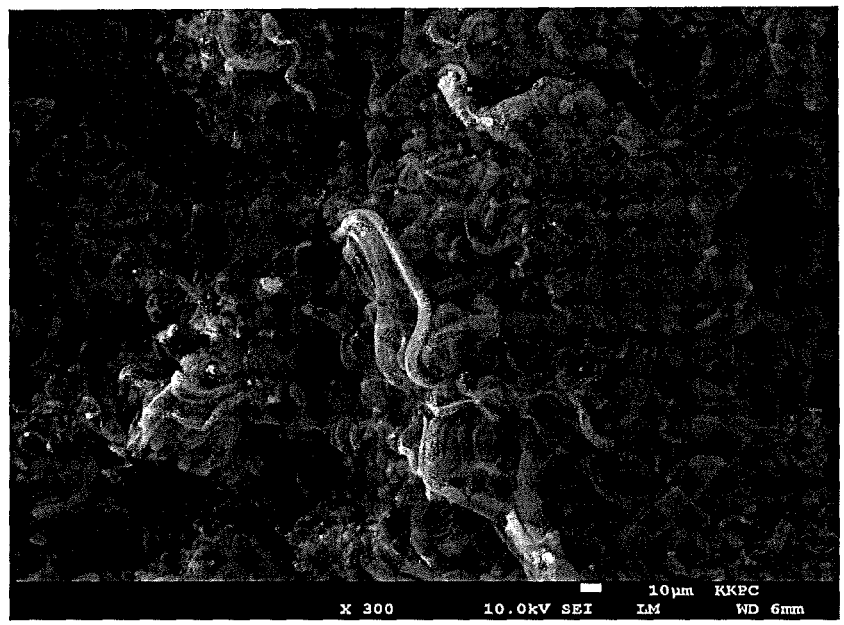
FIG. 3 shows a Field Emission Scanning Electron Microscope (FE-SEM) photograph (magnitude: 300×) of carbon nanotube having bundle moieties prepared in Example 2 of present invention.
Figure 4:
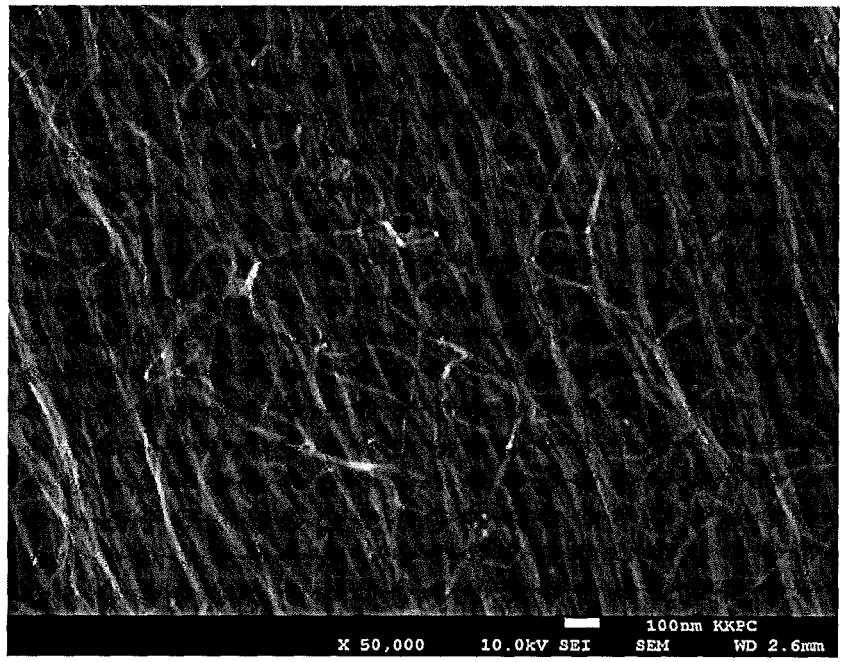
FIG. 4 shows a Field Emission Scanning Electron Microscope (FE-SEM) photograph (magnitude: 50,000×) of carbon nanotube having bundle moieties prepared in Example 2 of present invention.
Figure 5:
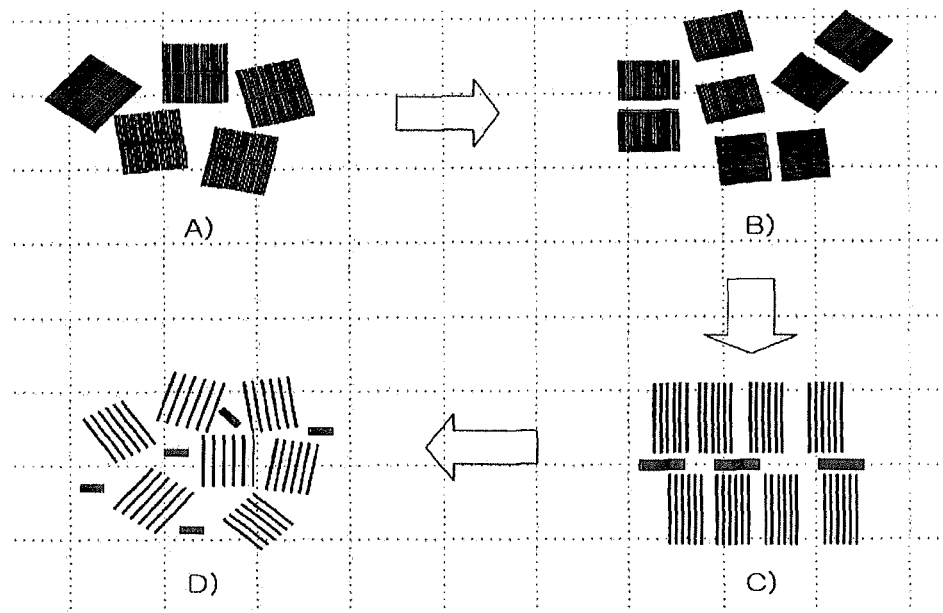
FIG. 5 shows schematic views illustrating the shapes of carbon nanotube having bundle moieties prepared in Examples of present invention according to the dispersion steps.

(2) Preparation of Carbon Nanotube Having Bundle Moieties 1 g of catalyst particle having 0.0820 g/cc of apparent density has been inserted in the quartz horizontal reactor having 100 mm of diameter using plate tray made by quartz. Ethylene as carbon source also flowed into the reactor in a velocity of 0.32 L/minute for 60 minutes. The reaction for preparing carbon nanotube having bundle moieties has been made at 650° C. The physical properties of prepared carbon nanotube having bundle moieties have been shown in Table 2. The bundle shape of obtained carbon nanotube has been shown in FIG. 3 and FIG. 4.

The thin film of carbon nanotube has been made from dispersed carbon nanotube solution using membrane filter. The surface resistance value of thin film has been measured as the same manner of Example 1. The results of surface resistance value of thin film made by carbon nanotube ethanol solution have been shown in Table 3.

Example 3

Preparation of Carbon Nanotube Having Bundle Moieties and Preparation of Dispersed Solution (1) Preparation of Metal Catalyst for the Synthesis of Carbon Nanotube Having Bundle Moieties 1,074.3 g of iron nitrate ($Fe(NO_3)_2.9H_2O$), 1,651.8 g of aluminum nitrate ($Al(NO_3)_3.9H_2O$), 31.8 g of magnesium nitrate ($Mg(NO_3)_2.6H_2O$), 155.19 g of manganese nitrate (Mn(NO$_3$)$_2$.H$_2$O) and 3 g of polyoxyethylene stearyl ether (Mw 5,000) have been mixed and dissolved in 2500 ml of distilled water for 2 hours with a magnetic stirrer. Obtained catalyst solution has been transferred in a velocity of 2 L/hour of air, and said catalyst solution has been sprayed into vertical thermal reactor from the spraying nozzle of 750° C. according to gas atomization method. The pyrolysis of sprayed catalyst solution has been made for 30 minutes. Then, the average particle size has been controlled less than 12.7 μm. The apparent density of obtained catalyst particle has been measured according to ASTM D 1895. The physical properties of obtained catalyst particle have been shown in Table 1. Further, FIG. 6 illustrates the flow chart for preparing catalyst composition used for preparing carbon nanotube having bundle moieties of Examples.

(2) Preparation of Carbon Nanotube Having Bundle Moieties 1 g of catalyst particle having 0.093 g/cc of apparent density has been inserted in the quartz horizontal reactor having 200 mm of diameter using plate tray made by quartz. Ethylene as carbon source also flowed into the reactor in a velocity of 0.32 L/minute for 60 minutes. The reaction for preparing carbon nanotube having bundle moieties has been made at 650° C. The physical properties of prepared carbon nanotube having bundle moieties have been shown in Table 2.

The thin film of carbon nanotube has been made from dispersed carbon nanotube solution using membrane filter. The surface resistance value of thin film has been measured as the same manner of Example 1. The results of surface resistance value of thin film made by carbon nanotube ethanol solution have been shown in Table 3.

Example 4

Preparation of Carbon Nanotube Having Bundle Moieties and Preparation of Dispersed Solution (1) Preparation of Metal Catalyst for the Synthesis of Carbon Nanotube Having Bundle Moieties 1,074.3 g of iron nitrate (Fe(NO$_3$)$_2$.9H$_2$O), 1,445.3 g of aluminum nitrate (Al(NO$_3$)$_3$.9H$_2$O), 31.8 g of magnesium nitrate (Mg(NO$_3$)$_2$.6H$_2$O), 232.8 g of manganese nitrate(Mn(NO$_3$)$_2$.H$_2$O) and 3 g of polyoxyethylene stearyl ether (Mw 5,000) have been mixed and dissolved in 2500 ml of distilled water for 2 hours with a magnetic stirrer. Obtained catalyst solution has been transferred in a velocity of 2 L/hour of air, and said catalyst solution has been sprayed into vertical thermal reactor from the spraying nozzle of 750° C. according to gas atomization method. The pyrolysis of sprayed catalyst solution has been made for 30 minutes. Then, the average particle size has been controlled less than 10.5 μm. The apparent density of obtained catalyst particle has been measured according to ASTM D 1895. The physical properties of obtained catalyst particle have been shown in Table 1. Further, FIG. 6 illustrates the flow chart for preparing catalyst composition used for preparing carbon nanotube having bundle moieties of Examples.

(2) Preparation of Carbon Nanotube Having Bundle Moieties 1 g of catalyst particle having 0.152 g/cc of apparent density has been inserted in the quartz horizontal reactor having 200 mm of diameter using plate tray made by quartz. Ethylene as carbon source also flowed into the reactor in a velocity of 0.32 L/minute for 60 minutes. The reaction for preparing carbon nanotube having bundle moieties has been made at 650° C. The physical properties of prepared carbon nanotube having bundle moieties have been shown in Table 2.

The thin film of carbon nanotube has been made from dispersed carbon nanotube solution using membrane filter. The surface resistance value of thin film has been measured as the same manner of Example 1. The results of surface resistance value of thin film made by carbon nanotube ethanol solution have been shown in Table 3.

Example 5

Preparation of Carbon Nanotube Having Bundle Moieties and Preparation of Dispersed Solution (1) Preparation of Metal Catalyst for the Synthesis of Carbon Nanotube Having Bundle Moieties 1,074.3 g of iron nitrate (Fe(NO$_3$)$_2$.9H$_2$O), 1,858.3 g of aluminum nitrate (Al(NO$_3$)$_3$.9H$_2$O), 77.58 g of manganese nitrate(Mn(NO$_3$)$_2$.H$_2$O) and 3 g of polyoxyethylene stearyl ether (Mw 5,000) have been mixed and dissolved in 2500 ml of distilled water for 2 hours with a magnetic stirrer. Obtained catalyst solution has been transferred in a velocity of 2 L/hour of air, and said catalyst solution has been sprayed into vertical thermal reactor from the spraying nozzle of 750° C. according to gas atomization method. The pyrolysis of sprayed catalyst solution has been made for 30 minutes. Then, the average particle size has been controlled less than 10.5 μm. The apparent density of obtained catalyst particle has been measured according to ASTM D 1895. The physical properties of obtained catalyst particle have been shown in Table 1. Further, FIG. 6 illustrates the flow chart for preparing catalyst composition used for preparing carbon nanotube having bundle moieties of Examples.

(2) Preparation of Carbon Nanotube Having Bundle Moieties 1 g of catalyst particle having 0.082 g/cc of apparent density has been inserted in the quartz horizontal reactor having 200 mm of diameter using plate tray made by quartz. Ethylene as carbon source also flowed into the reactor in a velocity of 0.32 L/minute for 120 minutes. The reaction for preparing carbon nanotube having bundle moieties has been made at 650° C. The physical properties of prepared carbon nanotube having bundle moieties have been shown in Table 2.

The thin film of carbon nanotube has been made from dispersed carbon nanotube solution using membrane filter. The surface resistance value of thin film has been measured as the same manner of Example 1. The results of surface resistance value of thin film made by carbon nanotube ethanol solution have been shown in Table 3.

Comparative Example 1

Preparation of Carbon Nanotube Having Bundle Moieties and Preparation of Dispersed Solution The preparation of metal catalyst for the synthesis of carbon nanotube has been made as the same manner of Example 1, except that polyoxyethylene stearyl ether (Mw 5,000) has not been inserted. Apparent density of catalyst particle has been measured according to ASTM D 1895. The physical properties of obtained catalyst particle have been shown in Table 1. Further, the physical properties of prepared carbon nanotube have been shown in Table 2.

The thin film of carbon nanotube has been made from dispersed carbon nanotube solution using membrane filter. The surface resistance value of thin film has been measured as the same manner of Example 1. The results of surface resistance value of thin film made by carbon nanotube ethanol solution have been shown in Table 3.

Comparative Example 2

Preparation of Carbon Nanotube Having Bundle Moieties and Preparation of Dispersed Solution Metal catalyst for the synthesis of carbon nanotube has the same composition of catalyst in Example 1. However, the metal catalyst has been prepared by precipitation method, which is different from spray pyrolysis method used in Example 1. After obtaining precipitated catalyst composition, this catalyst composition has been heat-treated at 700° C. for 2 hours. Apparent density of catalyst particle has been measured according to ASTM D 1895. The physical properties of obtained catalyst particle have been shown in Table 1. Further, the physical properties of prepared carbon nanotube have been shown in Table 2. The thin film of carbon nanotube has been made from dispersed carbon nanotube solution using membrane filter. The surface resistance value of thin film has been measured as the same manner of Example 1. The results of surface resistance value of thin film made by carbon nanotube ethanol solution have been shown in Table 3.

Table 1 shows the apparent density, composition, adding amount of low molecular weight polymer and average particle size of catalyst composition.

TABLE 1

| | Apparent density (g/cc) | Composition ratio(wt %) Fe:Al:Mn:Mg:Co | Polymer amount (wt %) | Average particle size(μm) |
|---|---|---|---|---|
| Example 1 | 0.067 | 4.95:4.95:0.0:0.1:0.0 | 1 | 21.6 |
| Example 2 | 0.082 | 4.95:4.45:0.5::0.1:0.0 | 1 | 20.7 |
| Example 3 | 0.093 | 4.95:3.95:1.0:0.1:0.0 | 1 | 12.7 |
| Example 4 | 0.152 | 4.95:3.45:1.5:0.1:0.0 | 1 | 10.5 |
| Example 5 | 0.082 | 4.95:4.45:0.5:0.1:0.0 | 1 | 20.7 |
| Comparative Example 1 | 0.068 | 4.95:4.95:0.0:0.1:0.0 | 0 | 28.6 |
| Comparative Example 2 | 0.950 | 4.95:4.95:0.0:0.1:0.0 | 0 | 38.4 |

Table 2 shows the apparent density, catalytic yield, fibrous diameter and structure of bundle shape of carbon nanotube having bundle moieties.

TABLE 2

| | Apparent density (g/cc) | Catalytic yield (%) | Fibrous diameter (μm) | Structure of bundle | | |
|---|---|---|---|---|---|---|
| | | | | Bundle shape | bundle full length (μm) | Diameter (μm) |
| Example 1 | 0.0076 | 950 | 14 | yes | 120 | 10 |
| Example 2 | 0.0072 | 1,240 | 9 | yes | 90 | 8 |
| Example 3 | 0.0094 | 1,310 | 11 | yes | 100 | 20 |
| Example 4 | 0.0096 | 1,150 | 13 | yes | 110 | 22 |
| Example 5 | 0.0048 | 2,370 | 9 | yes | 240 | 26 |
| Comparative Example 1 | 0.0276 | 880 | 14 | yes | 190 | 40 |
| Comparative Example 2 | 0.0900 | 870 | 18 | no | — | — |

Table 3 shows surface resistance value of thin film made by carbon nanotube ethanol solution.

| | Surface resistance(ohm/sq) |
|---|---|
| Example 1 | 204 |
| Example 2 | 198 |
| Example 3 | 220 |
| Example 4 | 260 |
| Example 5 | 184 |
| Comparative Example 1 | 300 |
| Comparative Example 2 | 628 |

What is claimed is:

1. A process for preparing a highly conductive carbon nanotube having bundle moieties with ultra-low bulk density comprising the steps of:
   i) obtaining a metal catalyst composition prepared by the following preparation steps comprising; a) dissolving 100 weight parts of metal catalyst particles represented by the following formula in water to obtain a solution, b) adding and mixing 0.1-20 weight parts of at least one low molecular weight polymer as an anti-aggregation agent to the solution obtained in step a) to yield a catalyst solution, c) spraying the catalyst solution into a high temperature reactor by a gas atomization method to obtain a gas atomized material, and d) preparing the metal catalyst composition with pyrolysis of the gas atomized material;

$(Fe, Co, Ni)_p(Al_aMg_bMn_c)_q$ wherein p and q represent molar fraction of $_p(Fe,Co,Ni)_p$ and $(Al_aMg_bMn_c)_q$, p+q=1, 0.3≤p≤0.8, 0.2≤q≤0.7, a, b and c represent molar fraction of Al, Mg, Mn, respectively;

a+b+c=1, 0.1≤a≤0.8, 0.1≤b≤0.9, 0.01≤c≤0.2, and ii) synthesizing a carbon nanotube having bundle moieties using a carbon source at 600-800° C. in the presence of the metal catalyst composition obtained in step i) according to a chemical vapor deposition method, wherein the apparent density of the metal catalyst particles is 0.03-0.90g/cc and the apparent density of the highly conductive carbon nanotube having bundle moieties is 0.003-0.010g/cc, wherein said at least one low molecular weight polymer has a weight average molecular weight($M_w$) in the range of 100-10,000g/mol.

2. The process for preparing a highly conductive carbon nanotube having bundle moieties according to claim 1, wherein said at least one low molecular weight polymer is selected from ionic or non-ionic dispersing agents.

3. The process for preparing a highly conductive carbon nanotube having bundle moieties according to claim 2, wherein said at least one low molecular weight polymer is at least one selected from sodium dodecyl benzene sulfate (NaDDBS), sodium dodecyl sulfate(SDS), cetyl trimethyl ammonium chloride(CTAC) or dodecyl trimethyl ammonium bromide(DTAB).

4. The process for preparing a highly conductive carbon nanotube having bundle moieties according to claim 2, wherein said at least one low molecular weight polymer is at least one non-ionic dispersing agent comprising head part and tail part, wherein the head part is at least one aromatic hydrocarbon selected from benzene, naphthalene, acenaphthylene, acenaphtene, anthracene, phenanthrene, pyrene or benzanthracene, and the tail part is a polymer chain consisting of hydrophilic repeating units.

5. The process for preparing a highly conductive carbon nanotube having bundle moieties according to claim 4, wherein the hydrophilic repeating units are ethylene oxide or propylene oxide.

* * * * *